United States Patent [19]

Dickson et al.

[11] Patent Number: 4,873,515
[45] Date of Patent: Oct. 10, 1989

[54] COMPUTER GRAPHICS PIXEL PROCESSING SYSTEM

[75] Inventors: Calvin M. Dickson, Salt Lake City; Kevin C. Rushforth, West Valley City, both of Utah

[73] Assignee: Evans & Sutherland Computer Corporation, Salt Lake City, Utah

[21] Appl. No.: 108,888

[22] Filed: Oct. 16, 1987

[51] Int. Cl.$^4$ .............................................. G09G 1/16
[52] U.S. Cl. .................................... 340/728; 340/723; 340/747
[58] Field of Search ............... 340/728, 729, 744, 751, 340/723; 364/518, 521, 522

[56] References Cited

U.S. PATENT DOCUMENTS

| | | | |
|---|---|---|---|
| 4,586,037 | 4/1986 | Nosener et al. | 340/728 |
| 4,591,844 | 5/1986 | Hickin et al. | 340/728 |
| 4,631,690 | 12/1986 | Corthout et al. | 340/747 |
| 4,704,605 | 11/1987 | Edelson | 340/728 |
| 4,748,572 | 5/1988 | Latham | 340/723 |
| 4,796,020 | 1/1989 | Budrikis | 340/728 |

OTHER PUBLICATIONS

"Filtering Edges for Gray-Scale Displays", *Computer Graphics*, vol. 15, No. 3, Aug. 1981, Satish Gupta et al.
"A VLSI Architecture for Updating Raster-Scan Displays", *Computer Graphics*, vol. 15, No. 3, Aug. 1981, Gupta et al.

*Primary Examiner*—Gerald L. Brigance
*Attorney, Agent, or Firm*—Nilsson, Robbins, Dalgarn, Berliner, Carson & Wurst

[57] ABSTRACT

A line-filtering antialiasing apparatus for a computer graphics display, with a set of parallel pixel processors functioning independently in a line drawing system and with plotting apparatus assigning individual pixels to the processors so as to track to the line. An optimum number of sixteen processors filter proximity data based on the vertical distance from a pixel center to the line center for shading pixels to gray-scale intensity in an area of influence four pixels wide. Line terminations are extended and shaded at the termination area. Pixel values for individual lines are summed to develop a total display image.

13 Claims, 6 Drawing Sheets

COMPUTER GRAPHICS PIXEL PROCESSING SYSTEM

BACKGROUND AND SUMMARY OF THE INVENTION

In television pictures, a jagged appearance for diagonally extending lines and edges are well recognized as a common defect. Although distracting, such jagged lines and edges with a "staircase" appearance are somewhat inherent in images produced by scanning the display in a raster pattern. As the images are defined by scanning substantially parallel horizontal lines of changing intensity and color, diagonally extending sharp lines and edges in the display tend to have the stepped appearance.

In addition to traditional television pictures, jagged lines and edges also present a problem in computer-generated graphic displays. In that regard, a substantial need exists for an improved system to process computer graphics data to accomplish improved lines and edges.

Traditionally, computer graphic images are composed of a large number of elements, i.e. a rectangular pattern or array of individual pixels (picture elements). Specifically, intensity and color values are assigned to the individual pixels that compose an image. In a color display, each pixel involves an intensity value for red, green and blue so that the composite attains the desired color and intensity. For example, each of the color intensity signals in a computer picture might have any of two hundred fifty-six different values. Accordingly, each pixel in the picture is represented by a set of numerical color values which are compiled in a memory (display buffer) that supplies signals to control a display apparatus, typically incorporating a cathode ray tube.

Normally, the pixels in a picture display are quite small in relation to the perception of the human eye. However, as indicated above, in a raster scan display of a picture with a sharp edge or line, the pixels tend to indicate a jagged or staircase edge. The pixel display can be analogized to the pattern of a blank crossword puzzle in which each individual square is like a pixel. Using such an analogy, it can be appreciated that a diagonal line defined by blackened squares will exhibit a jagged or staircase edge.

In general, the present invention is based on recognizing that lines and edges in a computer-graphics raster display can be made to appear smoother by widening the line to incorporate several pixels and varying the intensity of the pixels in an averaging or filtering process. The filtering process has the effect of shading or feathering the line to accomplish the antialiasing improvement. Lines formed by such a technique appear to the human eye to be smoother and clearer.

It has been previously proposed to filter edges and lines to accomplish antialiasing with improved de-jagged gray-scale displays. Such techniques are treated in a publication COMPUTER GRAPHICS, Volume 15, No. 3, August 1981, specifically in an article entitled "Filtering Edges For Gray-Scale Displays", Gupta & Sproull. Accordingly, the present invention involves an improved and effective system for processing display signals to accomplish antialiasing.

In the generation of computer graphics displays, usually it is important that the display be frequently refreshed. That is, to accommodate motion or change in the display as well as to preserve the image for viewing, fresh signals must be supplied to refresh the display each fraction of a second. The need to frequently refresh the display along with the great volume of data involved in the display necessitates a vast amount of computation to produce effective, dynamic color displays.

To accomplish the necessary computation for effective graphic displays, it has been proposed to employ a set of computing elements connected for parallel operation. Consider an example. A display might involve an array of 1024×1024 pixels. To hasten the computation for such a display, it has been proposed to utilize a parallel configuration of processors (eight by eight) to calculate the individual values for sixty-four pixels simultaneously. Such a system is disclosed in the publication COMPUTER GRAPHICS, Volume 15, No. 3, August 1981, in an article entitled "A VLSI Architecture for Updating Raster-Scan Displays", page 71. The technique can be analogized to the use of a frame of eight by eight pixels which figuratively can be variously positioned with respect to a display for rapidly processing the pixels that lie within the frame.

In general, the system of the present invention involves a pixel processing system for reducing undesirable jagged effects by expanding the number of pixels involved in the presentation of a line. For example, assuming the display of a diagonal line, the system of the present invention figuratively expands the area of influence by the line to embrace a width of plural pixels. Specifically, a plurality of individual pixel processors are organized to effectively process individual pixels in a pattern shaping to the line. The system of the present invention also incorporates techniques and apparatus for handling troublesome endpoints of lines and simplifying the filtering computations.

More specifically, the pixel processor system of the present invention processes several pixels in parallel to accomplish filtering for gray-scale displays based on the coordinate offset between line and pixel. In the disclosed embodiments, two by two and four by four arrays of pixel processors are suggested. The array is controlled to plot a path for processing data as along a line. Thus, in treating sets of pixels, the processor might be thought of as moving from position to position in a pattern to cover the display. That is, each of the individual pixel processors is assigned one of sixteen address offsets to identify individual pixel data for processing in a recurring pattern. For example, at the starting point of a line, each of the sixteen processors takes a starting location to define a two by two or a four by four array shaping to an initial portion of the line. As the array repeatedly shapes to the line, it often is not configured as a rectangle. With the independent parallel processors providing individual pixel data, rather than to draw a jagged line of constant intensity in the display, the system creates a de-jagged line of variable shaded intensity, which to the human eye appears quite smooth and clear. Special treatment is given endpoints of the line to minimize appearances of instability and mismatching. Pixel data for each line in a display is summed so that line cross-over points are intensified.

BRIEF DESCRIPTION OF THE DRAWINGS

In the drawings, which constitute a part of this specification, exemplary embodiments of the invention are set forth and illustrated as follows.

DESCRIPTION OF THE ILLUSTRATIVE EMBODIMENT

As indicated above, an illustrative embodiment of the present invention is disclosed herein. However, physical apparatus, data formats and component systems in accordance with the present invention may be embodied in a wide variety of forms, some of which may be quite different from those disclosed herein. Consequently, the specific structural and functional details presented herein are merely representative; yet in that regard, they are deemed to afford the best embodiment for purposes of disclosure and to provide a basis for the claims herein which define the scope of the present invention.

Figure 1:
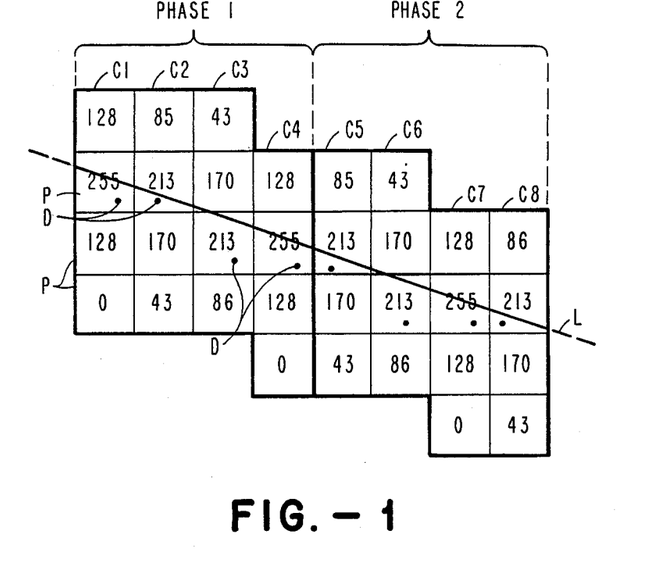
FIG. 1 is a diagrammatic representation illustrating the pixel processing operation of the system as disclosed herein.

Referring initially to FIG. 1, a fragment of a sloped line L is represented. In accordance with well known computer graphics techniques, the line may be represented by numerical data and exhibited on a display apparatus, the face of which is divided into a large array of pixels (picture elements). As illustrated, the line L traverses several individual pixels P of the display.

FIG. 1 is an idealized representation with the pixels P shown as squares and without overlap. The line L represents a display fragment extending across the pixels P, shown to be narrow, as it would be defined mathematically (point-to-point). Thus, as for other representations herein, FIG. 1 serves to illustrate explanations and not to depict actual displays.

For the present, assuming a black-and-white display, in accordance with traditional techniques, the pixels P substantially embracing the line L would be illuminated while other pixels P would be left black. As illustrated in FIG. 1, those pixels designated by a dot D would be illuminated (white) while all other pixels would remain black. Consequently, the line L would be formed by the pixels marked by a dot D and would appear as a jagged or staircase edge. The system of the present invention incorporates several additional pixels in the display of the line L and shades them to avoid the staircase appearance.

In accordance with the present invention, all of the illustrated pixels P (FIG. 1) define an area of influence that might effectively be used to display a line. Essentially, all of these pixels are considered for excitation at levels that are somewhat related to each pixel's proximity to the line L. Excitation levels for each pixel are indicated in FIG. 1.

Assume, for example, that each of the pixels P (FIG. 1) may be excited variously to provide two hundred fifty-six levels of illumination ranging from black to white. For example, a level of "0" represents total black while a level of "255" represents total white. In accordance with the present invention, as shown in FIG. 1, columns of four pixels each stagger to align with the line L and are individually excited to various levels for displaying the line L in a dejagged form that appears relatively narrow to the human eye. As the line L accordingly is presented in a shape different from that specified, filtering is implied. As might be expected, the antialiasing techniques of the present invention can be mathematically explained on the basis of signal frequency and filtering. However, for purposes of simplifying the explanation, the disclosed embodiment is treated in terms of space rather than frequency and filtering.

In accordance with the present invention, data for each of the pixels P is processed separately to variously excite the identified small individual areas in the display. For example, consider the column C1 which, as all the columns, comprises a stack of four individual pixels P. The line L passes somewhat centrally through the second pixel P in the column C1. Accordingly, the second pixel is excited to a level of total white as represented by the numerical value "255". In accordance herewith, the pixels P on either side of the white pixel are excited to a gray-scale level of "128" providing approximately half-level illumination. Thus, a fragment of the line is shaded for antialiasing.

In the second column C2 of FIG. 1, the line L passes through the lower portion of the second pixel. Consequently, the second pixel P is excited to a lower, but relatively high gray-scale level of "213", the top pixel P is excited to a level of "85", the third pixel P is excited to a level of "170" and the bottom pixel P is excited to a level of "43". Accordingly, while the level of white continues to concentrate in the second pixel, it is effectively shifted downward. Note that in a uniform line, the sum of the illumination intensity values for pixels in each column is substantially constant.

As illustrated in FIG. 1, as the line L progresses from left to right, the weight of illumination shifts downward. Note specifically that the downward shift continues in the column C3 and progresses as illustrated with each subsequent columnar movement to the right. As a consequence of the shifting, the column C4 is offset downward by a pixel illustrating the manner in which processing of the present invention shapes to the line L.

Generally, the pixels P of FIG. 1 illustrate two operating phases of sixteen individual pixel processors functioning in parallel to process signals for an array of pixels as shown. An embodiment of four processors operating in a two by two array is also considered herein.

As illustrated in FIG. 1, a set of sixteen pixels P are treated during Phase 1 by the sixteen separate processors. A second set of sixteen pixels are treated during Phase 2 by the same sixteen processors. Each set of pixels (the set of Phase 1 and the set of Phase 2) illustrates the operation of the set of sixteen parallel pixel processors as described in detail below. Similar sets of sixteen pixels are treated in sequence by the processors and proceed along the line L. Note that each processor accordingly processes the pixels of a sub-image in a spaced pattern.

It is important to note that in the pixel processing as described generally above and in detail below, the columns (C1 through C8) may be staggered or offset on an individual basis so that the processors act on shifted columns of pixels and shape to the line L. Also, as indicated above, the data for each pixel P is computed utilizing filtering techniques to determine a pixel value (as illustrated) to shade the pixel and present the line L as a smooth, clear edge. Stated another way, the columns C1 through C8, each with a height of four pixels, collectively define an area of influence in relation to the line L in which area individual pixels are modulated for a de-jagged presentation. Note that an equivalent operating format would treat pixels in horizontal rows rather than vertical columns.

The line L as considered above is of uniform intensity. Thus, as explained, the indicated pixel values of FIG. 1 represent intensity values for a uniform degree of illumination. Alternatively, if a line is of variable intensity, the indicated pixel values of FIG. 1 are factored with the line values, pixel by pixel along the length of the line. Such operation is involved in depth cuing, a well known computer graphics technique.

Figure 1A:
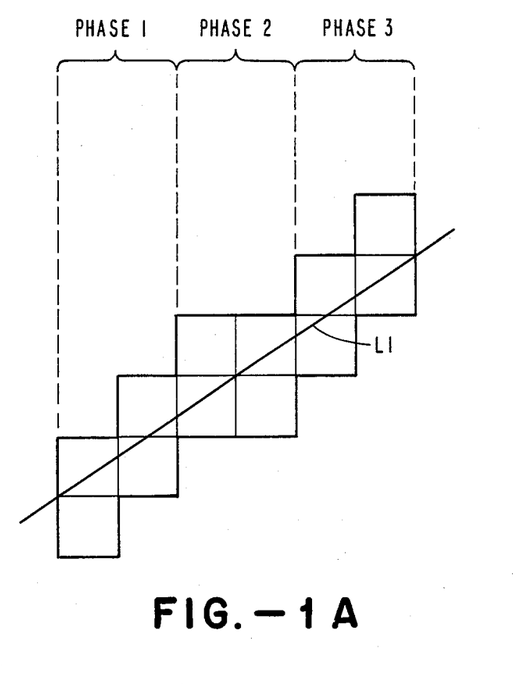
FIG. 1A is a view similar to FIG. 1 illustrating a modification for the system of FIG. 2.

The process of the present invention may be accomplished by various numbers of processors configured to operate in various arrays. In addition to the desirable array of sixteen processors in a four by four array, a two by two array of four processors merits mention. Accordingly, such an array is illustrated in FIG. 1A showing three phases of operation. A line L1 is shown to pass through three sets of pixels, each set of four pixels. In a system hereof, the pixels would be processed in three phases (Phase 1, Phase 2 and Phase 3) by a two by two array of four processors. The system would take a form similar to that described below; however, in the detailed explanation, a four by four array is described below.

Figure 2:
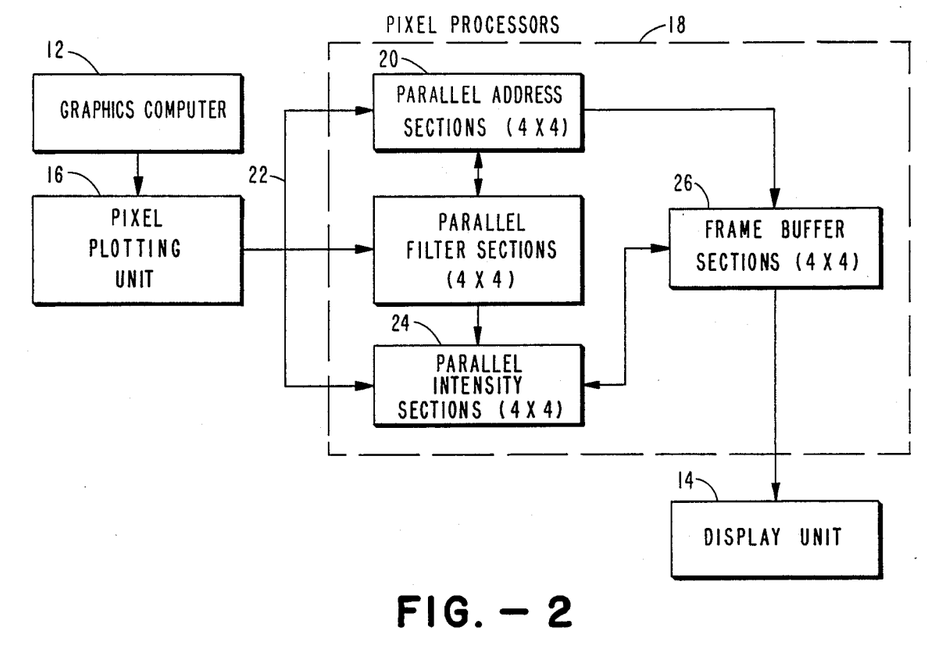
FIG. 2 is a block diagram of a system constructed in accordance with the present invention.

Turning now to the structure of the disclosed embodiment, reference will be made to FIG. 2 showing a system incorporating the sixteen parallel processors as functionally described above. Generally, the system of FIG. 2 is embodied as a line-drawing system. That is, a desired display is accomplished by a composite of individual lines which are treated in sequence to accumulate representative signal data for a picture.

Line-drawing systems are very well known in the prior art, one form of which is the PS300 manufactured by Evans & Sutherland Computer Corporation of Salt Lake City, Utah. In the past, such systems have incorporated both raster scan and calligraphic display techniques. However, in an embodiment incorporating the present system, raster scan techniques are used exclusively with good results.

In the system of FIG. 2, a graphics computer 12 (upper left) provides raw data for processing to accomplish a colored line picture on a display unit 14 (lower right). In the disclosed embodiment, the display unit 14 may take the form of a cathode ray tube as well known in the prior art. The graphics computer 12 also may take various well known forms essentially as incorporated in the PS300 as mentioned above.

First consider the operation of the system of FIG. 2 somewhat preliminarily. The graphics computer 12 provides data specifying individual lines (as by line endpoints specified in rectangular coordinates). Line by line, the data is processed and accumulated to accomplish a stored image for accomplishing a rasterscan picture by the display unit 14. In addition to specifying the locations and lengths of lines, signal represented data from the graphics computer 12 also specifies intensity and color for the lines.

The graphics computer 12 is connected to a pixel plotting unit 16 to specify lines for plotting. The plotting unit 16 is connected to the pixel processors 18, represented in FIG. 2 as four distinct structures.

Essentially, the sixteen pixel processors represented in FIG. 2 each include an address section, a filter section, an intensity section and a frame buffer section. Accordingly, the processors 18 are illustrated as separate blocks representative of address sections 20, filter sections 22, intensity sections 24 and frame buffer sections 26, all of which are considered in detail below.

The pixel plotting unit 16 is connected to each of the parallel address sections 20, the parallel filter sections 22 and the parallel intensity sections 24. Note that each of the sections 20, 22, 24 and 26 comprise sixteen individual sections or units functioning simultaneously in parallel to separately process individual pixels as illustrated in FIG. 1. That is, the sixteen pixel processors (collectively represented by the sections 20, 22, 24 and 26) account for and process sets of sixteen pixels in sequence, as represented in Phases 1 and 2 of FIG. 1.

The parallel address sections 20 of the pixel processors 18 are connected to the frame buffer sections 26 along with the parallel intensity sections 24. In that regard, the intensity sections 24 provide pixel data to develop lines, which data is accumulated by circulating from the frame buffer sections 26 to the intensity sections 24.

To accomplish a display, the frame buffer 26 is connected to the display unit 14. Generally, frame buffers are well known in the prior art, commonly taking the form of a memory which regularly supplies signals to a display unit to refresh and maintain an image. However, as indicated above, in the present system the frame buffer is distributed among the pixel processors in sixteen sections.

To consider the system of FIG. 2 in greater detail, assume now that: the graphics computer 12 provides signals specifying line endpoints P1 and P2 in coordinate representations X1,Y1 and X2,Y2. Thus, a vector or line V (FIG. 3) is specified. The signals specifying points P1 and P2 are supplied from the computer 12 to the pixel plotting unit 16 which operates with the parallel address sections 20 to assign the parallel filter sections 22 and the parallel intensity sections 24 to process individual pixels. The computer 12 further specifies the color and intensity of the line V in terms of three color intensity signals red, blue and green. The color signals are applied to the intensity sections 24 for processing as described in detail below. Note that the parallel intensity sections 24 may incorporate depth cuing as that technique is well known in the art to reflect depth.

As indicated above, the parallel filter sections 22 are sixteen in number and, accordingly, are capable of processing sixteen pixels simultaneously as illustrated by the two phases of FIG. 1. Functionally, the parallel filter sections 22 (FIG. 2) provide a factor for each pixel (intensities illustrated in FIG. 1) which is applied to vary the designated intensity of the line at the represented position. In accordance herewith, the filter sections 22 can be designed to compute pixel values based on various weighting or filtering techniques. The filtering basically involves a calculation to attain the desired shading as explained above. For example, a volume integral calculation could be employed as described in the above-referenced Gupta-Sproull article. However, in the disclosed embodiment, a substantial number of values are precomputed based on the proximity of a pixel to a line. Specifically, values are precomputed for several different vertical (coordinate) distances from pixel to line. Those values are then stored in a look-up table provided in each of the parallel filter sections 22 as disclosed in detail below. The use of a look-up table for such functions is known in the prior art as a technique for economizing both with regard to time and structure.

Recapitulating to some extent, the pixel plotting unit 16 in cooperation with the parallel address sections 20 assign the computing filter sections 22 to individual pixels. Essentially, the pixel plotting unit 16 in combination with the parallel address sections 20 simply implement a point-plotting algorithm to displace working locations (pixels) for the parallel filter sections 22 along the line V (FIG. 3) in spaced relationship with respect to the line V. The pixel plotting unit 16 and parallel address sections 20 may be implemented to execute a well known point-plotting algorithm developed by Bresenham, see IBM Systems Journal 4(1):2-30, July 1965, specifically an article by Bresenham entitled "Algorithm For Computer Control Of A Digital Plotter". Bresenham's algorithm provides address data for a display and increments X while conditionally incrementing Y each time an error term exceeds one pixel and must be cut back to a sub-pixel value. Further reference to FIG. 3 will illustrate the operation.

Figure 3:
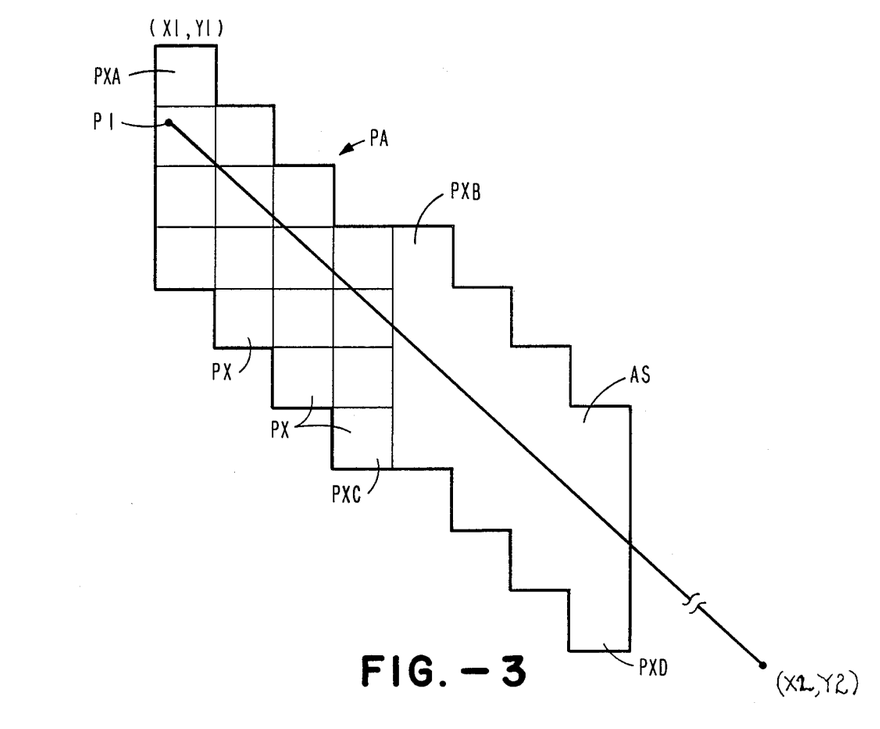
FIG. 3 is a diagram illustrating the operation of the system of FIG. 2.

As the system of FIG. 2 operates to begin processing data for a line V (FIG. 3), the pixel plotting unit 16 functions in combination with the parallel address sections 20 to assign the sixteen picture element areas PX in an area of influence PA (FIG. 3). Somewhat more specifically, the parallel address sections 20 (FIG. 2) each register an address of one of the pixel element areas PX (represented by small squares in FIG. 3) for one of the filter sections 22, one of the intensity sections 24 and one of the frame buffer sections 26.

In the parallel filter sections 22 (FIG. 2), the addressed pixels PX (FIG. 3) are processed in sets of sixteen, based on the proximity (vertical offset) of each picture element PX from the line V. Accordingly, the filter sections 22 each query a lookup table to provide a filter intensity factor or value ranging from "−1" to "+1". This operation is explained in greater detail below; however, at this point, it is important to understand that the sixteen parallel filter sections 22 (FIG. 2) are assigned individually to the sixteen pixel areas PX (FIG. 3) for sixteen separate parallel processing operations. The processing is performed accordingly for the sixteen pixel areas PX (FIG. 3) to provide factors which are supplied individually from the filter sections 22 (FIG. 2) to the parallel intensity sections 24. The indicated signal intensities for each of the three colors as provided from the graphics computer 12 are then multiplied in the sections 24 by the factors. The resulting pixel values are supplied from the parallel intensity sections 24 to the frame buffer sections 26 for accumulation to enable raster scan signals for the display unit 14. As a result, intensity levels are accomplished for the area of influence PA in accordance herewith and as illustrated in FIG. 1, to provide smooth, clear lines.

In FIG. 3, it is to be noted that with the complete processing of the area of influence PA, the system enters another phase to process another set of pixels defining another area of influence AS for the line V. Accordingly, the system plots along the line V section-by-section until the endpoint is attained. The processing results for each section or phase are accumulated in the frame buffer sections 26. The detailed operation of the filter sections 22 (FIG. 2) is treated in greater detail below. Also, note that additional operations are performed with respect to the line endpoints P1 and P2 to further improve the display as described in detail below. Note that after the line V is processed, with attendant results stored in the frame buffer sections 26, another line is similarly specified and processed. Thus, the complete image data is developed in the frame buffer sections 26.

Recapitulating to some extent, the sixteen pixel processors represented collectively by the sections 20, 22, 24 and 26 in FIG. 2 each process one of sixteen pixel address offsets in an array (areas PA and AS, FIG. 3) which are described. Accordingly, when the starting point information for a line (X1,Y1) is provided, each processor modifies that information to describe a starting point or initial pixel in the sub-image which that processor addresses. In FIG. 3, one of the sixteen processors would process data for the pixels PXA and PXB. Concurrently, another of the sixteen processors would process data for the pixels PXC and PXD. Thus, the processing assignments or addressing shapes to the line. Consequently, instead of drawing a jagged line of constant intensity, the processors provide data for a filtered, feathered or shaded line of variable intensity as explained with reference to FIG. 1.

Figure 4:
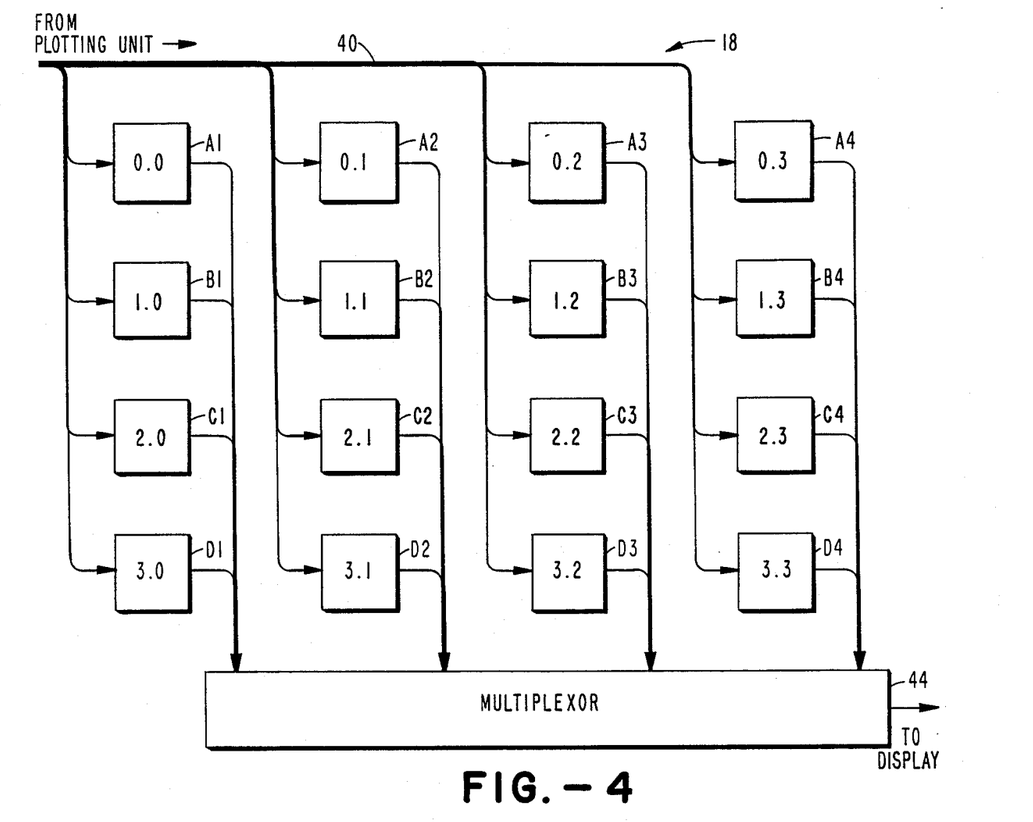
FIG. 4 is a block diagram of a component portion of the system of FIG. 2.

Reference will now be made to FIG. 4 showing a different perspective of the pixel processors 18. Specifically, FIG. 4 shows an array of sixteen individual processors for developing the display data in sets of sixteen pixels. The processors of FIG. 4 are designated alphanumerically by numbered columns and alphabetized rows from A1 to D4 specifically including the individual processors: A1, A2, A3, A4, B1, B2, B3, B4, C1, C2, C3, C4, D1, D2, D3 and D4. Coordinating FIG. 4 with FIG. 2, note that each of the processors A1, A2 and so on (FIG. 4) includes an address section 20 (FIG. 2), a filter section 22, an intensity section 24 and a frame buffer section 26.

The individual processors A1-D4 are connected in parallel by cables 40 to receive plotting data (as with respect to a line) from the plotting unit 16 (FIG. 2). The processors operate on an array of sixteen pixels positioned just as the sections are illustrated in FIG. 4. For example, during each phase of operation the section A1 operates for an individual pixel in the array of pixels as illustrated in FIG. 1. The processors A2, A3 and A4 function on the adjacent pixels to the right. Similarly, the processors of rows B, C and D operate on lower pixels in the array.

It is to be understood that in order for the processors A1-D4 to track the line, rows or columns in the processed array may be shifted to an offset as illustrated in FIGS. 1 and 3. Also, if a line to be processed exceeds an angle of forty-five degrees to be more vertical, the processors step vertically. Consequently, lines are always processed or "drawn" in a shallow direction either vertically or horizontally. However, in either event, with respect to the line (FIG. 3) the width of the processing will generally be at the optimum value of four pixels. In an alternative embodiment described above, processing is by a two-by-two array of four processors which is desirable for some situations. In any event, utilizing the well known Bresenham plotting technique, each of the sections A1 through D4 operates on an assigned pixel in a current array disposed to track a line as illustrated in FIG. 1.

By the operation of their individual filter sections, the processors A1-D4 (FIG. 4) each independently utilize data indicating a pixel location and its relationship to the line to provide a factor ($-1$ to $+1$) for adjusting the intensity of the line at the pixel of concern. The individual parallel intensity sections in each of the processors A1-D4 then applies the factor to the line intensity signal data. The resulting signals are accumulated in the frame buffer section for each processor A1-D4 so that each processor stores a sub-image of the desired picture. Note that each sub-image consists of a multiplicity of pixels that are spaced apart in the picture, based on the array of the sixteen pixel processors as a pattern.

The sub-image signals are supplied for display to a multiplexor 44 which, with regard to FIG. 2 is provided in the display unit 14. Thus, in summary, the individual processors A2-D4 operate in parallel simultaneously computing individual values attributable to a specific time for their assigned pixels. Note that the independent operation of the pixel processors attains the function of shaping to the line. When all the lines for a display have been processed and the resulting pixel values summed in the frame buffer sections 26, the pixel values are supplied through the multiplexor 44 to drive the display device, traditionally a cathode ray tube (not shown).

Figure 5:
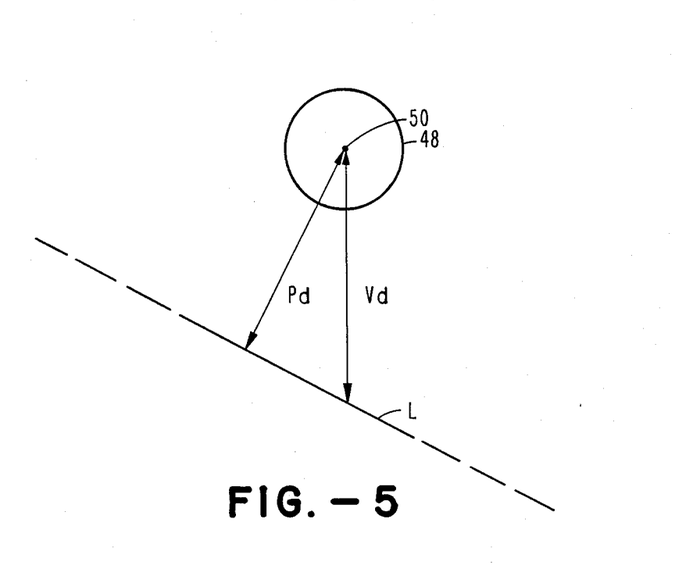
FIG. 5 is a diagram illustrative of the operation of processors in the system of FIG. 2.

As indicated above, the operation of the filter sections 22 (FIG. 2) may be considered one of filtering; however, the operation can be space related to facilitate explanation. Such an explanation is illustrated in the article "Filtering Edges For Gray-Scale Displays" referred to above. Various forms of filtering may be employed and in accordance with known techniques, in the disclosed embodiment, computed values are stored in look-up tables for retrieval on the basis of the proximity of a line to a pixel. Specifically in that regard, in accordance with the present invention, the proximity of a line to a pixel is resolved to the vertical distance of the offset. Of course, it is actually the coordinate distance which accommodates either horizontal or vertical processing. FIG. 5 illustrates the calculation of the vertical distance values in accordance with the described mode of operation.

FIG. 5 shows a single circular pixel area 48 which is assumed to be mathematically defined in terms of the coordinates for a center point 50. Note that the pixel area of FIG. 5 is circular while pixel areas discussed above have been illustrated somewhat theoretically as squares. Again, the precise shape of the pixel area will depend on the display device; however, the pixel areas will normally be defined mathematically and might be illustrated in any of a variety of shapes. Note that while FIG. 5 is an illustration in plane geometry, the filtered gray-scale calculations are usually performed in a solid geometric form. In that regard, conical and bell shapes have both been used to compute shading values.

The pixel 48 is represented to be within the area of influence of a line L. Specifically, the center 50 of the pixel is spaced from the center of the line L by a short vertical distance Vd. Also, the perpendicular distance Pd from the line L to the pixel center 50 is indicated. In accordance with traditional techniques for accomplishing gray-scale or antialiased lines, the perpendicular distance Pd traditionally has been used as the criterion for determining pixel values. In accordance with the present invention, it has been discovered that with considerable economy, the vertical distance Vd alone can be employed to determine the gray-scale factors for individual pixels as the pixel 48. The economy results because the vertical distance Vd is readily available from the Bresenham plotting algorithm as implemented by the parallel address sections 20. Considering the detailed structure of the filter sections 22 will illustrate the operation.

Figure 6:
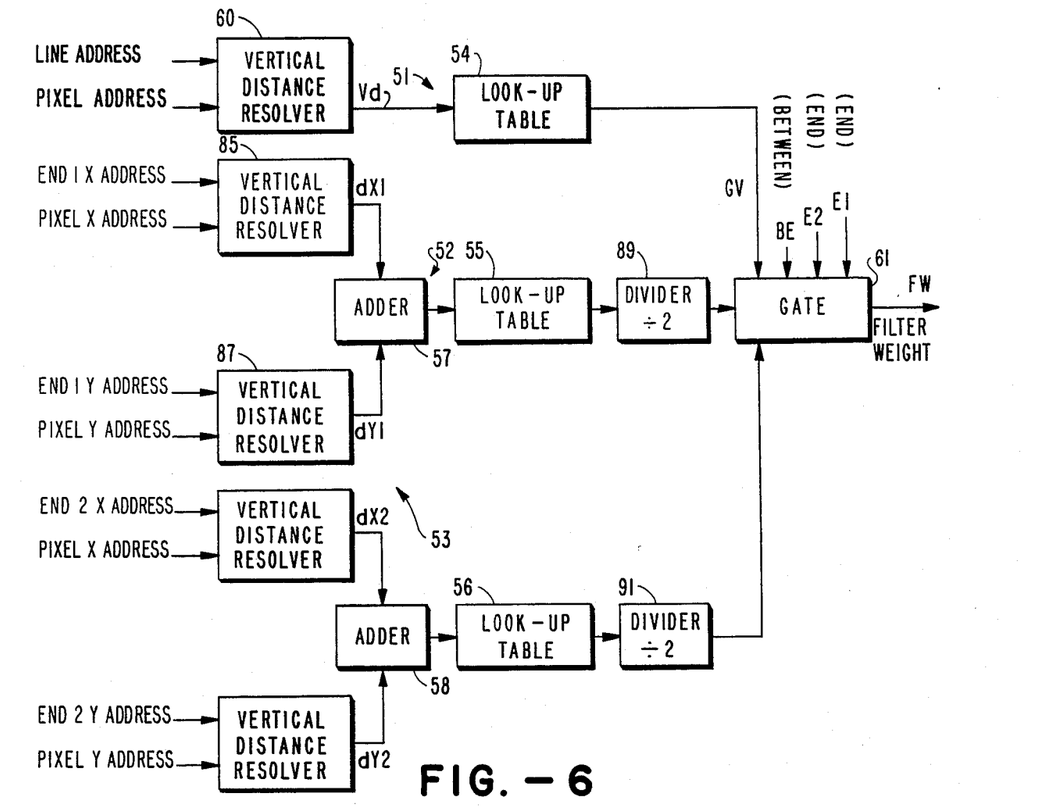
FIG. 6 is a block diagram of another component portion of the system of FIG. 2.

FIG. 6 shows details of a filter section 22 (FIG. 2), each of the sixteen filter sections being of the same structure. The upper portion 51 of the filter section processes interim locations in a line while the middle portion 52 processes first endpoints and the lower portion 53 processes second endpoints. The processing of initial and terminating endpoints of a line is treated in substantial detail below. However, some preliminary comments are deemed appropriate at this point in the description.

FIG. 6 shows three separate look-up tables 54, 55 and 56, one in each of the portions 51, 52 and 53 respectively. In an actual implementation of the system, the three tables are replaced by a single time-shared look-up table. However, the three tables 54, 55 and 56 are convenient for purposes of explanation. For the same reason, in the referenced operating implementation, a pair of adders 57 and 58 are replaced by a single adder.

Consider now the operation of the upper portion 51 to filter interim pixels (not at an endpoint). A vertical distance resolver 60 is illustrated to receive line address signals and pixel address signals. The resolver 60 may take various forms in various embodiments of the present invention, the calculation being simpler than the calculation of the perpendicular distance Pd. However, as suggested above, in an operating embodiment that implements the Bresenham plotting algorithm, the vertical distance Vd is readily available as an error term. Consequently, it is directly available to address the look-up table 54.

Signals indicative of the vertical distance Vd are applied to the look-up table 54 to provide a gray-scale value GV to a gate 61.

During the processing of interim line pixels, the gate 61 is qualified by a between-ends signal Be. Accordingly, depending on the vertical distance, a filter weight signal FW is provided from the gate 61 for use in the associated intensity section as described below. Again, note that the filter weight signal FW manifests values from $-1$ to $+1$, to accomplish pixel shading and antialiasing.

To continue with the explanation of processing interim-point data, reference will now be made to FIG. 7 which illustrates the intensity section 24 that is associated with the filter section of FIG. 6. The associated frame buffer 26 is also shown in FIG. 7.

Figure 7:
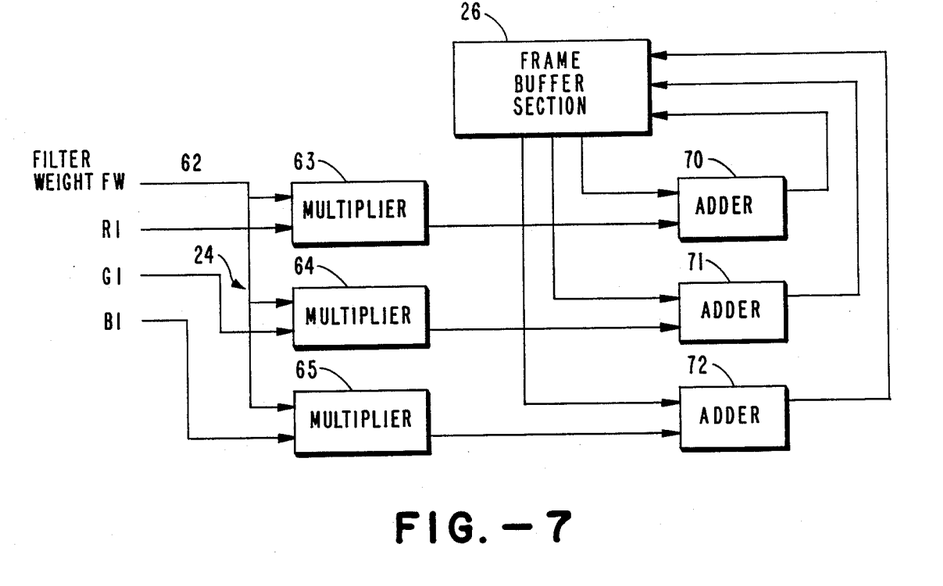
FIG. 7 is a block diagram of still another component portion of the system of FIG. 2.

The filter weight signal FW is supplied from the gate (FIG. 6) to an input 62 of the intensity section 24 (FIG. 7, upper left). The filter weight signals FW are applied to three multipliers 63, 64 and 65, one for each of the primary light colors red, blue and green. The multipliers 63, 64 and 65 each also receive a color intensity signal from the pixel plotting unit 16 (FIG. 1). Respectively, the multipliers 63, 64 and 65 receive the color intensity signals RI (red), GI (green) and BI (blue). The filter weight signals FW are thus factored with the color intensity signals to attain shaded pixel values for the line. Note that the intensity signals may be modulated to reflect depth cuing, as mentioned above, in accordance with well known techniques.

As explained above, a picture display normally comprises a substantial number of individual lines. In accordance herewith, the pixel data for each line in a display is summed. Specifically in that regard, the pixel data processed from the multipliers 63, 64 and 65 is summed by a series of adders 70, 71 and 72 which function cooperatively with the frame buffer section 26 as accumulators for individual pixel data. For example, assuming a pair of crossing lines, pixel data at the intersection is accumulated in the frame buffer section 26, from the distinct processing of the two lines. Thus, line crossings are displayed with the combined intensity of the crossing lines. With completion of all line processing, the frame buffer sections 26 provide signals to drive the display unit 14 (FIG. 2).

While the system as described above is effective in accomplishing smooth lines, as indicated, a need exists to treat the endpoints of such lines. Consideration will now be directed to treatment of endpoints.

Terminations or endpoints of lines may be improved considerably by antialiasing techniques. In that regard, raw lines tend to have misshaped vibrating ends. Also, the ends of substantially parallel, abutting lines may not appear to join, i.e. gaps or bright spots may appear between them. Furthermore, unfiltered short lines may disappear from a display. Accordingly, the system of the present invention incorporates apparatus and techniques to gray-scale filter endpoints and accomplish antialiasing.

It has been previously proposed to filter line endpoints as indicated in the above-referenced publication "Filtering Edges For Gray-Scale Displays". The article discloses the use of a look-up table to provide pixel intensities at the endpoints of a line.

In accordance with the present invention, and in the disclosed embodiment, line endpoints are processed to be softer. Specifically, in the disclosed embodiment, lines are terminated with reduced intensity and are initiated in the display two pixels early and terminated two pixels late. Note that in accordance herewith, lines need not end on a pixel, but rather can be terminated within the resolving power of the coordinates of the system.

Figure 8:
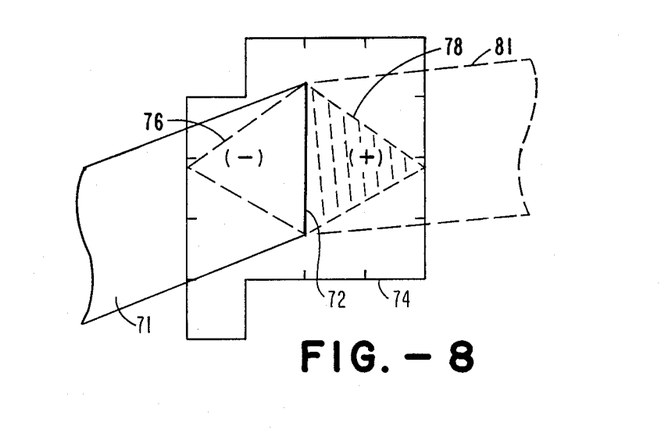
FIG. 8 is a graphic representation of an operation performed in the system of FIG. 2.

Referring to FIG. 8, a line 71 is represented generally as an area of influence touching pixels which will be affected in accordance herewith. As mathematically defined for the display, the line 71 terminates at an edge 72. As illustrated, the line 71 with the terminating edge 72 is superimposed on an indicated pixel grid 74 defining an array of pixels as explained above. Note that the grid 74 is only partially illustrated; however, it indicates the sixteen individual pixels as described above which are processed by sixteen individually associated processors (FIG. 3). Note that the grid 74 is staggered or offset with the first column of pixels being dropped in a manner to track to the line 71 as repeatedly stressed above.

Generally, in accordance herewith, the termination of the line 71 is enhanced by reducing the gray-scale intensity of the termination over a triangular hatched area 76 and adding a triangular area 78 of similarly attenuated intensity. A diamond shape of half intensity results. The operation involves adding two columns of pixels to the end of the line and modifying two line end columns of pixels, all accomplished within one phase of operation by the sixteen processors.

Terminating lines with end treatment as illustrated in FIG. 8 which is somewhat distorted for the convenience of illustration with the diamond terminations (actually squares) the system can produce considerable improvement in the visual quality of displayed terminations. In that regard, adjoining lines are married more effectively. Short lines are seldom lost and line terminations tend to exhibit less visual vibration.

Considering a pair of joined lines, a line 81 is illustrated in a dashed line representation to abut the line 71. The terminator for the line 81 would be the opposite of the line 71 with regard to the areas 76 and 78. Thus, in compound effect, the two lines would be smoothly married by overlapped diamonds.

Consider now the structure for accomplishing the diamond terminations. As indicated in the above-referenced article, "Filtering Edges For Gray-Scale Displays", various line terminations can be accomplished by utilizing a look-up table. Such a technique is employed in the disclosed embodiment as will now be considered.

The endpoints are filtered in accordance with the following expressions to accomplish graphics as illustrated in FIG. 8, $$\text{For end of line: } FW = f(Vd) - \frac{f(dx + dy)}{2}$$

$$\text{For extension: } FW = \frac{f(dx + dy)}{2}$$

The structure for attaining such terminations comprises the portions 52 and 54 of the filter sections as illustrated in FIG. 6. The portion 52 includes a pair of vertical distance resolvers 85 and 87 each of which receive endpoint and pixel signals, specifically X and Y addresses for the end and pixel addresses. From such signals vertical distance values are developed as represented by signals dx1, dy1, dx2 and dy2. These difference signals are summed by adders 57 and 58 for values to address look-up tables 55 and 56 respectively. The resultant filter values are halved by divider circuits 89 and 91 then applied to the gate 61. At the endpoint one, the gate passes the output of the divider 89 and at the endpoint two the output of the divider 91 is passed. Thus, the filter weight signal FW is developed for line endpoints to attain the operation as graphically depicted in FIG. 8.

Figure 9:
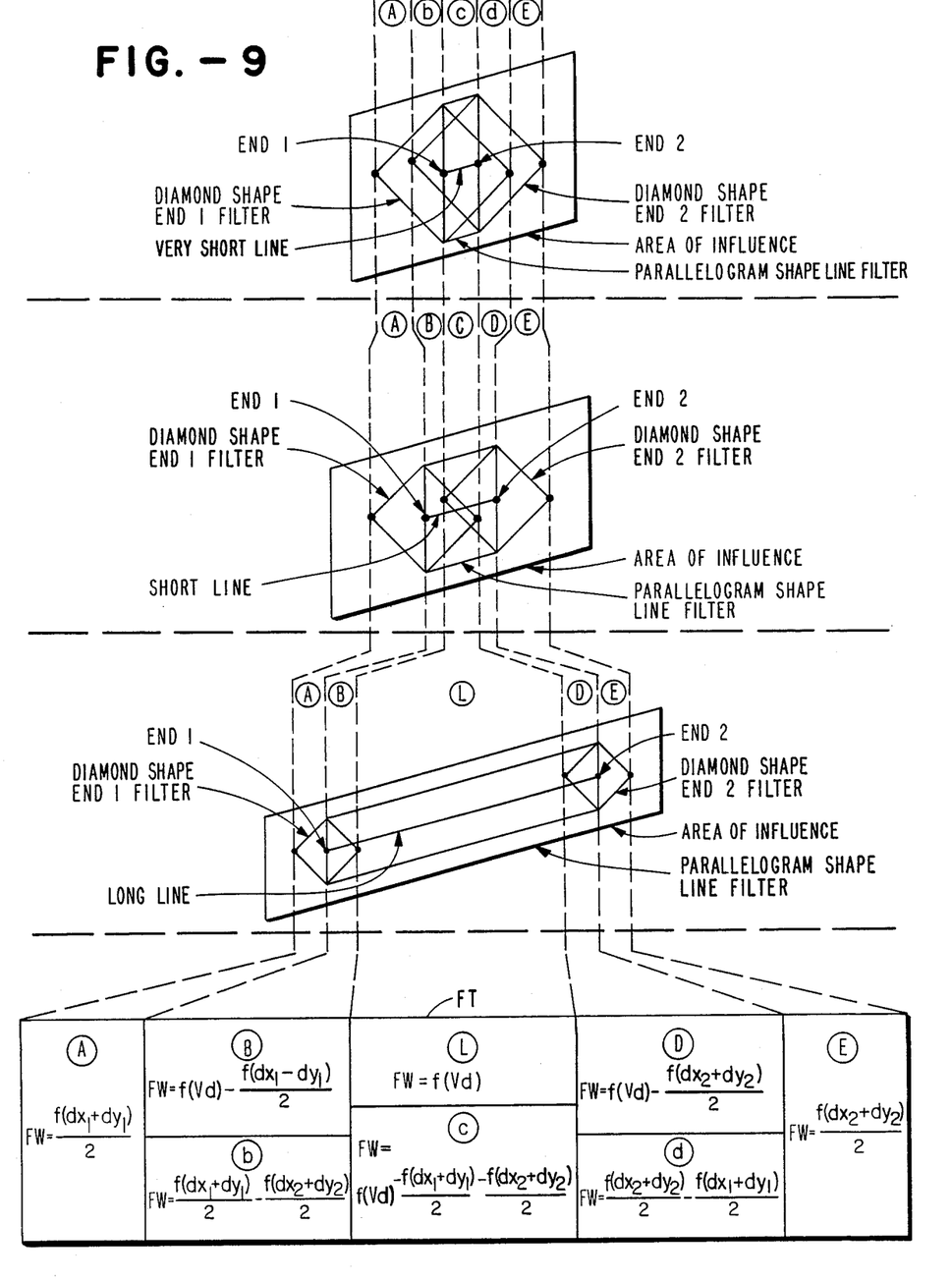
FIG. 9 is a diagram illustrating the process of the system of FIG. 2 with some mathematical correlation.

FIG. 9 illustrates the functions for different line lengths, the mathematical expressions utilized and the resulting graphics. From top to bottom, illustrations are of a very short line, a short line and a long line. The operations for each line are zoned vertically and correlated by alignment with a table FT at the bottom of the figure. The specific expressions employed for different operations are also keyed by the encircled letters A, B, b, C, D, d, E and L in the table FT. Thus, the functions and the results as described in detail above are concisely summarized in FIG. 9.

From the above detailed description, it may be seen that the system of the present invention affords an effective means for improving the display of lines and edges in computer graphics apparatus. Certain key aspects of the system are deemed to afford considerable improvement. Such aspects or features include: shaping to the line, using only vertical distance as a basis for determining the pixel values, terminating lines in diamond shapes of reduced intensity, using working line widths of two or four pixels and summing junction signals for highlighted intensity. Lines formed with a system incorporating these features appear smoother and neither jump nor crawl. Of course, it is recognized that a wide variety of techniques and apparatus may be employed in accordance herewith depending on the specific objectives involved, the nature of the systems and the subject of the display. Consequently, the scope hereof is deemed to be appropriately determined by the claims as set forth below.

What is claimed is:

1. A computer graphics system for receiving display data, as in a form to specify a line in a display, said system for providing representative pixel data for said display and comprising:
    a plotting unit for providing address data, as to specify a line in said display;
    a plurality of parallel processors coupled to said plotting unit, said parallel processors being individually coupled for processing data for individual pixels of said display in stages, each stage treating an array of pixels in columns of a predetermined number of pixels, said columns being aligned individually substantially to said line to track said line, said processors providing display data for individual pixels in sequence and varying as the proximity of a pixel to a specified line; and
    means for receiving and storing said display data in an arrangement for display.

2. A system according to claim 1 wherein said columns are of four pixels.

3. A system according to claim 1 comprising two columns.

4. A system according to claim 2 wherein said processors process an array of sixteen pixels.

5. A system according to claim 1 comprising four columns.

6. A system according to claim 1 wherein said processors provide display data modulated in intensity as related to the coordinate distance from pixel to line.

7. A system according to claim 1 further including means to add pixels at an end of said line.

8. A system according to claim 7 further including means to modulate pixels at said end of said line in accordance with values stored in a look-up table.

9. A computer graphics system for receiving display data, as in a form to specify a line in a display, said system for providing representative pixel data for said display and comprising:
    a plotting unit for providing address data, as to specify a line in said display;
    a plurality of parallel processors coupled to said plotting unit, said parallel processors individually processing data for individual pixels of said display in stages, each stage treating an array of pixels, said processors providing display data for individual pixels in sequence and providing distinct display data at terminations of a said line of reduced intensity and varying as the sum of the coordinate distances; and
    means for receiving and storing said display data in an arrangement for display.

10. A system according to claim 9 wherein said processors reduce the intensity representations for said terminations by substantially one-half.

11. A system according to claim 9 wherein said parallel processors comprise address sections for locating pixels, filter sections for shading filter weight signals and intensity sections for modulating intensity signals in accordance with said filter weight signals.

12. A system according to claim 9 further comprising means for processing data for cross-over points between plurality of said lines including means to sum said display data at terminations for said lines for said cross-over points to provide increased intensity.

13. A computer graphics system for receiving display data, as in a form to specify individual lines in display said system for providing representative pixel data for said display and comprising:
    a plotting unit for providing address data, as to specify a line in said display;
    a plurality of parallel processors coupled to said plotting unit, said parallel processors individually processing data for individual pixels of said display in stages, said processors providing display data for individual pixels in sequence and varying as the proximity of pixel to a specified line; and
    means for processing data for cross-over points between a plurality of said lines including means to sum said display data at terminations for said lines for said cross-over points to provide increased intensity.

* * * * *

UNITED STATES PATENT AND TRADEMARK OFFICE
CERTIFICATE OF CORRECTION

PATENT NO. : 4,873,515
DATED : October 10, 1989
INVENTOR(S) : Calvin M. Dickson and Kevin C. Rushforth It is certified that error appears in the above-identified patent and that said Letters Patent is hereby corrected as shown below:

| Column | Line | |
|---|---|---|
| 3 | 40 | insert --L-- after "line"; |
| 4 | 11 | delete "dejagged" and insert therefor --de-jagged--; |
| 6 | 42 | delete ":"; |
| 7 | 45 | delete "lookup" and insert therefor --look-up--; |
| 14 | 30 | insert --a-- before "display"; and |
| 14 | 30 | insert --,-- after "display". |

Signed and Sealed this

Sixteenth Day of October, 1990

Attest:

HARRY F. MANBECK, JR.

*Attesting Officer*  *Commissioner of Patents and Trademarks*